US008079220B2

(12) United States Patent
Haggerty

(10) Patent No.: US 8,079,220 B2
(45) Date of Patent: Dec. 20, 2011

(54) FUEL DISTRIBUTION MANIFOLD SYSTEM FOR GAS TURBINE ENGINES

(75) Inventor: Daniel T. Haggerty, Clive, IA (US)

(73) Assignee: Delavan Inc, West Des Moines, IA (US)

( * ) Notice: Subject to any disclaimer, the term of this patent is extended or adjusted under 35 U.S.C. 154(b) by 662 days.

(21) Appl. No.: 12/229,935

(22) Filed: Aug. 28, 2008

(65) Prior Publication Data
US 2010/0050645 A1  Mar. 4, 2010

(51) Int. Cl.
*F02C 9/34* (2006.01)
(52) U.S. Cl. .............................. 60/776; 60/739; 60/800
(58) Field of Classification Search ............... 60/39.094, 60/734, 739, 746, 747, 800, 776
See application file for complete search history.

(56) References Cited

U.S. PATENT DOCUMENTS

| 2,690,648 | A | * | 10/1954 | Hiscox et al. ................... 60/739 |
| 4,028,888 | A | | 6/1977 | Pilarczyk |
| 4,221,405 | A | | 9/1980 | Stonitsch |
| 4,467,610 | A | | 8/1984 | Pearson et al. |
| 4,708,371 | A | | 11/1987 | Elsworth et al. |
| 5,031,407 | A | * | 7/1991 | Zaremba et al. ................ 60/739 |
| 5,197,288 | A | | 3/1993 | Newland et al. |
| 5,259,185 | A | | 11/1993 | Peterson |
| 5,263,314 | A | | 11/1993 | Anderson |
| 5,427,419 | A | * | 6/1995 | Frey et al. ................... 285/123.1 |
| 6,339,924 | B1 | | 1/2002 | Hoyer et al. |
| 6,460,893 | B1 | * | 10/2002 | McGrath .......................... 285/49 |
| 6,487,860 | B2 | * | 12/2002 | Maversky et al. .............. 60/739 |

FOREIGN PATENT DOCUMENTS
JP        2004162581 A      6/2004

OTHER PUBLICATIONS
UK Intellectual Property Office Search Report transmitted Nov. 30, 2009.

* cited by examiner

*Primary Examiner* — Ehud Gartenberg
*Assistant Examiner* — Lorne Meade
(74) *Attorney, Agent, or Firm* — Scott D. Wofsy; Edwards Wildman Palmer LLP

(57) ABSTRACT

A fuel distribution manifold system for a gas turbine engine is disclosed that includes a plurality of interconnected manifold segments, each manifold segment extending between a pair of fittings, each manifold segment including at least one fuel transfer tube and a sealing tube that surrounds the at least one fuel transfer tube, wherein opposed end portions of the at least one fuel transfer tube are dynamically connected to the fittings and opposed end portions of the sealing tube are statically connected to the fittings.

25 Claims, 16 Drawing Sheets

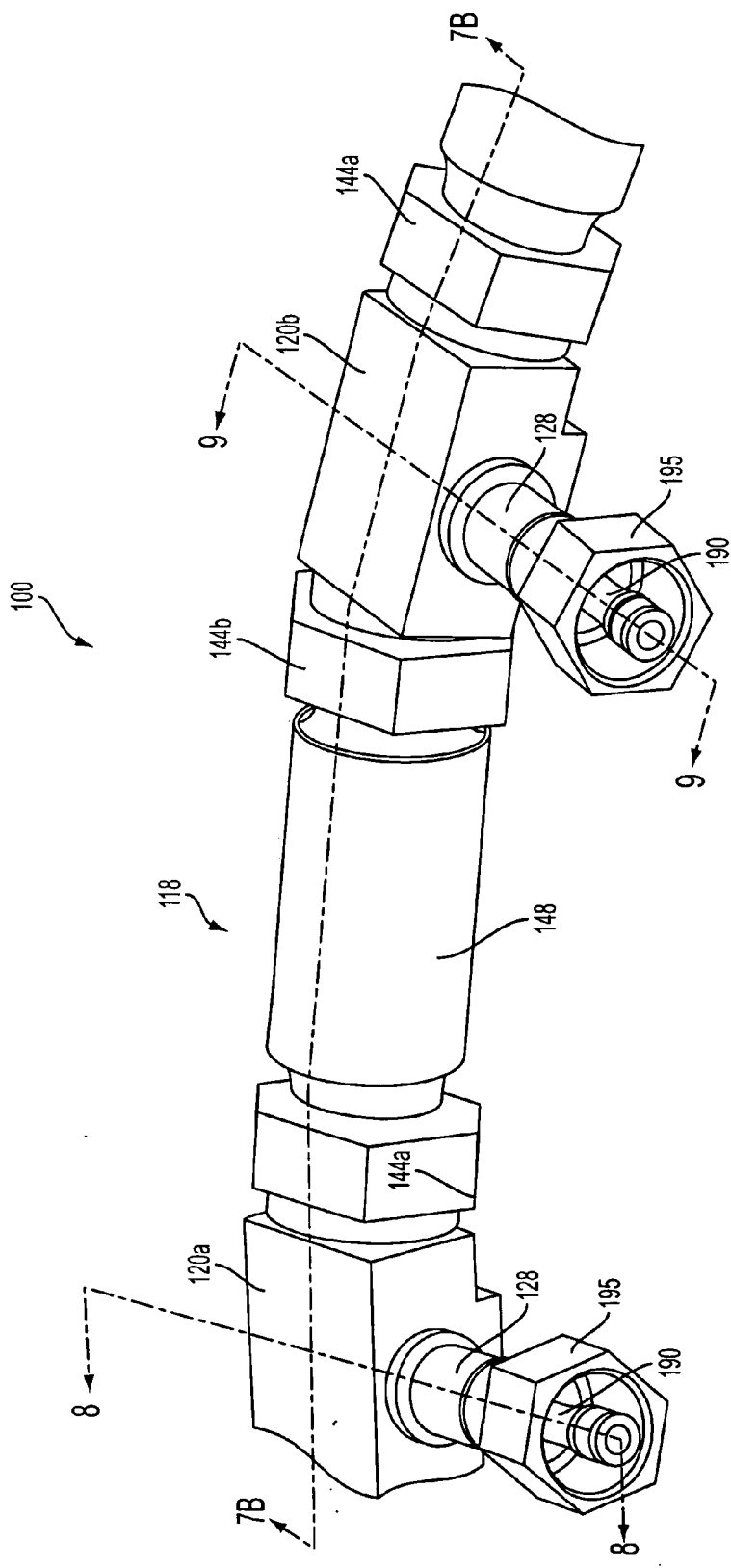

FUEL DISTRIBUTION MANIFOLD SYSTEM FOR GAS TURBINE ENGINES

BACKGROUND OF THE INVENTION

1. Field of the Invention

The subject invention is directed to gas turbine engines, and more particularly, to a fuel distribution manifold system for a gas turbine engine configured to accommodate thermal expansion and contraction of the engine case.

2. Description of Related Art

The fuel manifold system of a gas turbine engine distributes fuel from a fuel control system to a plurality of fuel injectors mounted on the engine case. The fuel injectors are configured to issue atomized fuel into the combustor of the engine. It is well known that combustor inlet air temperatures are extremely high (e.g., 700° C.). These high temperatures put a tremendous thermal strain on engine components associated with the combustor casing. These engine components must structurally accommodate thermal expansion and contraction of the combustor casing during engine operating cycles.

In this regard, it is well known that the fuel manifold system of a gas turbine engine must be able to accommodate the thermal expansion and contraction of the combustor casing. Traditionally, thermal expansion of the engine case has been accommodated by using curved metal tubes to flexibly connect the fuel lines of the manifold assembly to the fuel injectors. An example of a fuel manifold assembly that includes curved metal tubes is shown in U.S. Pat. No. 5,197,288 to Newland et al. Prior art designs of this type are often plagued by vibration and fatigue. Another solution has been to use flexible hoses to connect the fuel lines of the manifold assembly to the fuel injectors. An example of these flexible hose connections is disclosed in U.S. Pat. No. 4,467,610 to Pearson et al. These types of flexible connection lines are relatively ineffective in high temperature applications. Accordingly, there is a need in the art for a fuel distribution manifold system for a gas turbine engine that is designed to accommodate thermal expansion and contraction of the combustor casing that overcomes the problems associated with prior art designs.

It would also be beneficial to provide a fuel distribution manifold system configured to withstand the thermal strain associated with the combustor casing that can be used in conjunction with a gas turbine engine employing staged combustion. In a staged combustion system, fuel is selectively delivered to the fuel injectors through certain fuel lines of the manifold assembly while other fuel lines are shut off. However, it has been found that stagnant fuel in the non-flowing manifold lines can heat-up and cause coking, rendering the manifold system ineffective over time. The subject invention provides a solution to this problem by maintaining all of the fuel lines in the manifold assembly relatively cool, even when one or more of the fuel lines is shut-off.

SUMMARY OF THE INVENTION

The subject invention is directed to a new and useful fuel distribution manifold system for a gas turbine engine that is adapted and configured to accommodate thermal expansion and contraction of the engine's combustor casing during engine operating cycles.

In one embodiment of the subject invention, the manifold system includes a plurality of interconnected manifold segments. Each manifold segment extends between a pair of fuel injector inlet fittings and includes at least one fuel transfer tube for transferring fuel between the inlet fittings. The opposed end portions of the fuel transfer tube are received within a central bore of each inlet fitting and the opposed end portions of the fuel transfer tube are dynamically connected to the inlet fittings by annular sealing means. Preferably, the annular sealing means include one or more heat resistant O-ring seals seated at the opposed end portions of the fuel transfer tube. However, it is envisioned that the annular sealing means can be seated within grooves formed in the central bore of each inlet fitting to provide the dynamic connection with the fuel transfer tube.

In accordance with the subject invention, a radially outer sealing tube surrounds the radially inner fuel transfer tube. The opposed end portions of the sealing tube are statically or otherwise fixedly connected to the inlet fittings, in contrast to the dynamic connections between the fuel transfer tube and the inlet fittings. Preferably, the sealing tube includes a resilient section in the form of a bellows or similar structure for accommodating axial expansion and contraction of the sealing tube as the combustor casing thermally expands and contracts during engine operation. By surrounding the fuel transfer tube, the outer sealing tube provides leak protection with respect to the sealing means associated with the opposed end portions of the fuel transfer tube. In addition, a cover tube preferably surrounds the sealing tube of each manifold segment to protect the resilient bellows section of the sealing tube. The cover tube also helps to increase the internal pressure capacity of the resilient bellows section of the sealing tube by stabilizing the outer surface thereof.

The sealing tube can be slightly longer then the manifold segment length between fuel injector inlet fittings. As a result, the resilient bellows section of the sealing tube would be compressed when installed between the inlet fittings. This initial installation compression would be beneficial to the bellows cyclic loading life.

In an embodiment of the subject invention, the fuel distribution manifold system further includes means for detecting fuel leakage in the manifold system. Preferably, the means for detecting fuel leakage in the manifold system includes a series of drainage passages that are formed in each inlet fitting to define a continuous drainage path between the plurality of manifold segments. That is, the drainage passages of the inlet fittings are in fluid communication with sealing gaps formed between the fuel transfer tube and expansion tube of each manifold segment. The drainage path leads to a collector preferably located at the bottom of the manifold system. The collector can be provided with a sight glass or similar structure to permit visual inspection of its contents, if any, or a fluid sensor can be associated with the collector to provide a visual, audible or electronic signal indicating that a leak has occurred within the manifold assembly.

The subject invention is also directed to a fuel distribution manifold system for a gas turbine engine employing staged combustion, which is configured to ensure that all of the fuel lines in the manifold assembly are kept relatively cool during engine operation, even when one or more of the fuel lines is shut-off. In this regard, the manifold system includes a plurality of circumferentially spaced apart fuel injector inlet fittings that extend around a periphery of the engine. These inlet fittings include adjacent pairs of first and second inlet fittings. A manifold segment extends between adjacent pairs of first and second inlet fittings and each manifold segment includes at least first, second and third coaxially arranged fuel transfer tubes. By nesting the plural fuel transfer tubes in this manner, fuel flowing through one or more of the transfer tubes will continuously cool the fuel tubes not in use, thereby preventing stagnant fuel in those lines from coking.

The first fuel transfer tube in each manifold segment is situated to deliver fuel to a first fuel circuit of the manifold assembly formed in both the first and second inlet fittings, the second fuel transfer tube in each manifold segment is situated to deliver fuel to a second fuel circuit of the manifold assembly formed in the first inlet fitting and the third fuel transfer tube in each manifold segment is situated to deliver fuel to a third fuel circuit of the manifold assembly formed in the second inlet fitting. The flow of fuel to one or more of the three fuel circuits of the manifold assembly is controlled by a fuel control system that is adapted and configured or otherwise programmed to facilitate staged combustion over the operating cycle of the gas turbine engine, primarily to improve engine efficiency.

To accommodate the thermal expansion and contraction of the combustor casing, opposed end portions of the coaxially arranged first, second and third fuel transfer tubes of each manifold segment are dynamically connected to the inlet fittings by annular sealing means. Preferably, the annular sealing means are one or more O-rings seals seated at the opposed end portions of each of the coaxially arranged fuel transfer tubes. In addition, each manifold segment includes a sealing tube that surrounds the coaxially arranged fuel transfer tubes to provide leak protection for the system. Preferably, the opposed end portions of the sealing tube are statically connected to the inlet fittings by coupling means and the sealing tube includes a resilient bellows section for accommodating axial expansion and contraction of the sealing tube during engine operation.

The subject invention is also directed to a method of delivering fuel to a gas turbine engine employing staged combustion. The novel method includes the steps of providing a fuel distribution manifold assembly as described above, wherein each manifold segment includes at least first, second and third coaxially arranged fuel transfer tubes that communicate with first, second and third fuel circuits, respectively, and delivering fuel to at least one of the fuel circuits through at least one of the fuel transfer tubes. Preferably, the step of delivering fuel to at least one of the fuel circuits includes delivering fuel to the first fuel circuit and at least one other fuel circuit. The method further includes the step of staging fuel delivery to the gas turbine engine by delivering fuel through the first and second fuel circuits under a first engine operating condition, and delivering fuel through the first and third fuel circuits under a second engine operating condition.

Those skilled in the art will readily appreciate that the unique, segmented configuration of the fuel distribution manifold assembly of the subject invention allows for removal of individual manifold segments between inlet fittings. It also accommodates the ready removal of individual fuel injectors for repair or replacement.

These and other features and benefits of the manifold assembly of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the fuel distribution manifold system of the subject invention without undue experimentation, preferred embodiments thereof will be described in detail herein below with reference to certain figures, wherein:

FIG. 7A is a perspective view of the section of the fuel distribution manifold system shown in FIGS. 5 and 6, as viewed from below;

DETAILED DESCRIPTION OF PREFERRED EMBODIMENTS

Figure 1:
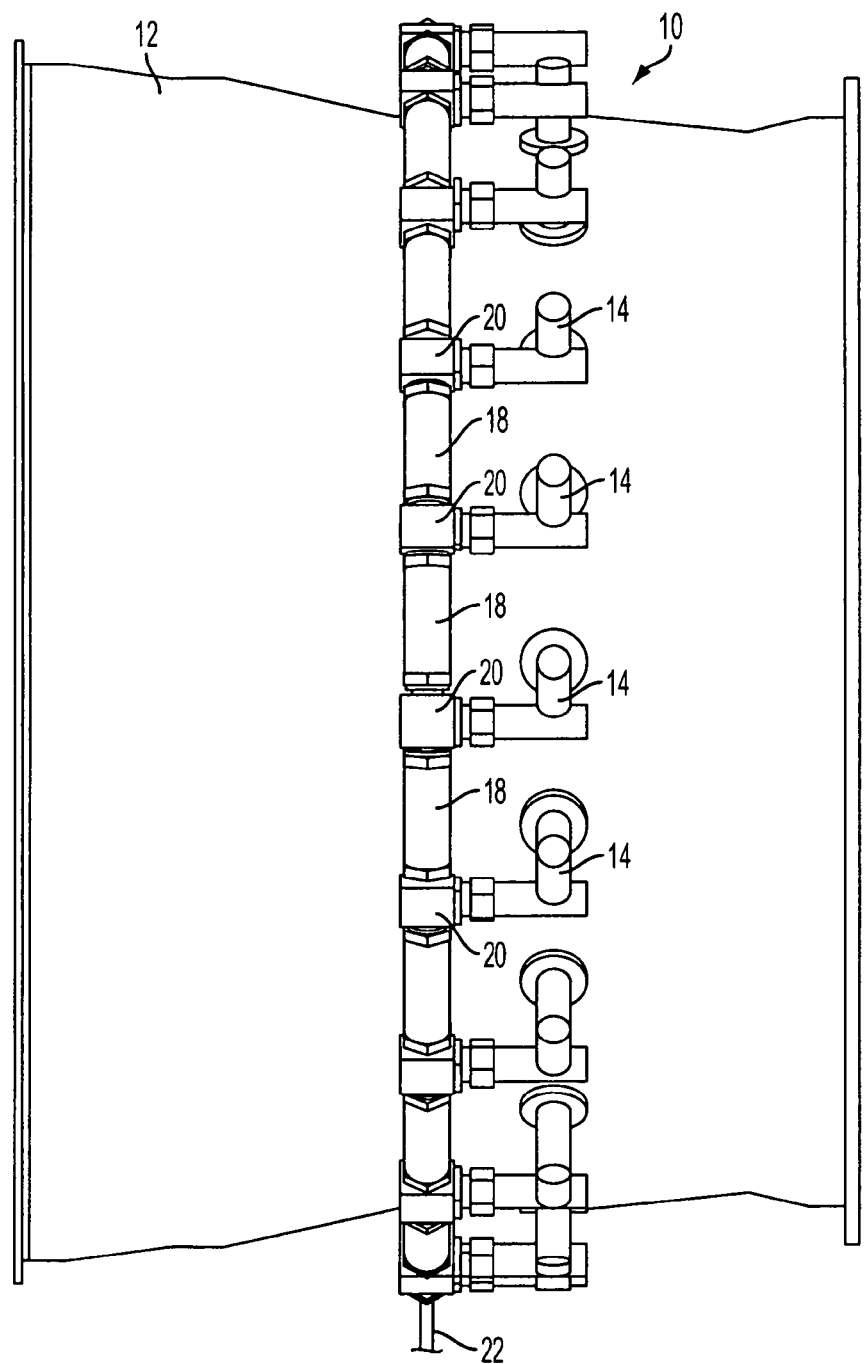
FIG. 1 is a side elevational view of the fuel distribution manifold system of the subject invention, shown in an axial configuration, surrounding the combustor casing of a gas turbine engine.

Referring now to the drawings, wherein like reference numerals identify or otherwise refer to similar structural features or elements of the various embodiments of the subject invention, there is illustrated in FIG. 1 a fuel distribution manifold system constructed in accordance with a preferred embodiment of the subject invention, and designated generally by reference numeral 10.

Figure 2:
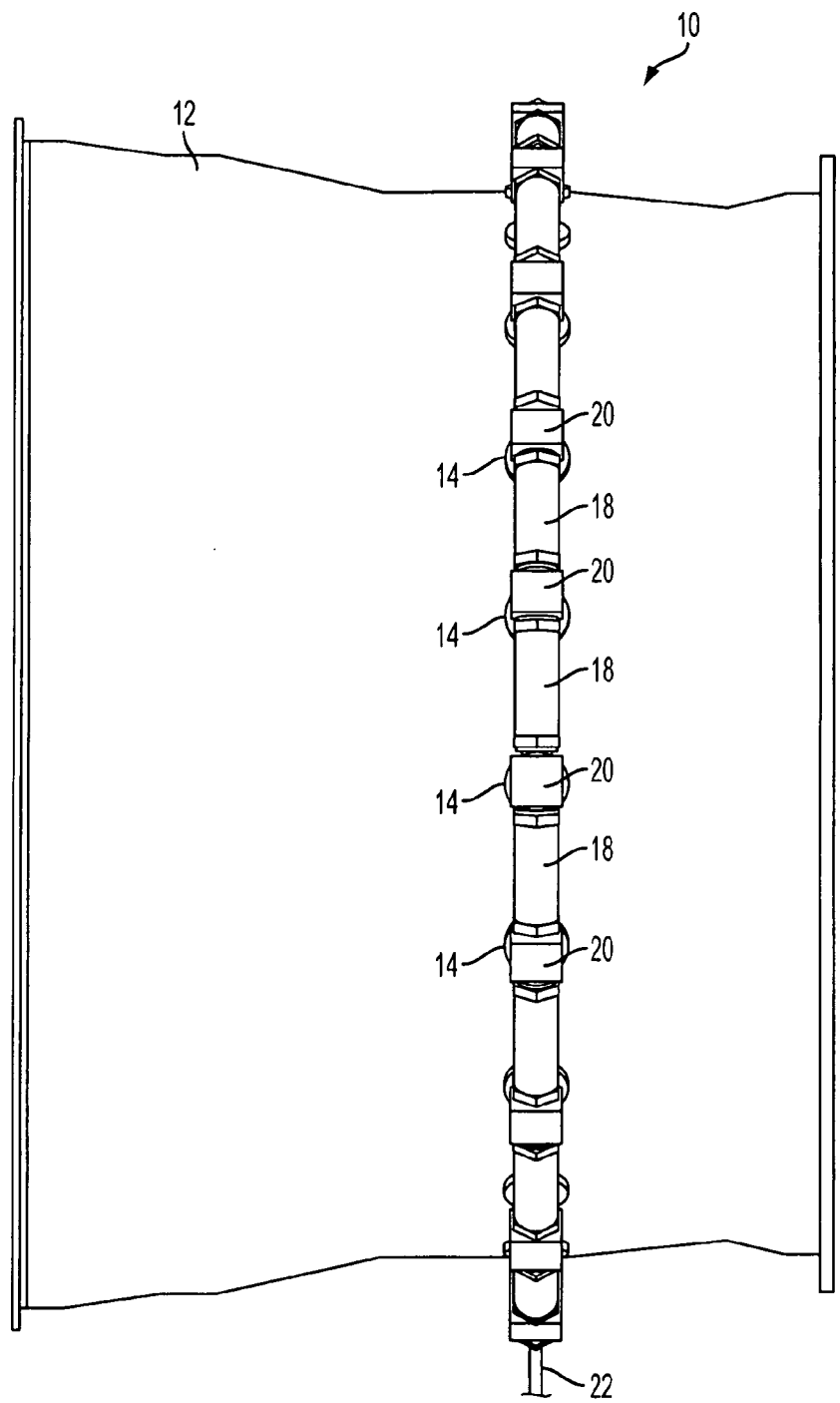
FIG. 2 is a side elevational view of the fuel distribution manifold system of the subject invention, shown in a radial configuration, surrounding the combustor casing of a gas turbine engine.

More particularly, FIG. 1 shows the fuel distribution manifold system 10 of the subject invention in an axial configuration operatively associated with the combustor casing 12 of a gas turbine engine. In this configuration, the connective portions of the fuel injector inlet fittings 20 of manifold assembly 10 extend in an axial direction to the fuel injectors 14 (i.e., parallel to the longitudinal axis of the combustor casing). In contrast to the axial configuration shown in FIG. 1, there is illustrated in FIG. 2 a radial configuration of fuel distribution manifold assembly 10. In the radial configuration, the connective portions of the fuel injector inlet fittings 20 extend in a radially inward direction (i.e., perpendicular to the longitudinal axis of the combustor casing 12), as shown for example in FIG. 3A.

Referring to FIGS. 1 and 2, fuel distribution manifold system 10 includes a plurality of circumferentially arranged manifold segments 18 that are serially connected to one another by a plurality of fuel injector inlet fittings 20. A manifold inlet 22 is located at the bottom dead center of the manifold assembly 10 for receiving fuel from a supply source via a fuel control system. Those skilled in the art will readily appreciate that the manifold inlet 22 would be operatively associated with one or more flow control valves, such as, for example, solenoid-type flow control valves for controlling the flow of fuel to the manifold assembly as commanded by the fuel control system.

It is envisioned that the circumferentially arranged manifold segments 18 of manifold assembly 10 can be arranged in one continuous loop substantially surrounding the entire combustor casing 12. Alternatively, the segments of the manifold assembly can be arranged into a plurality of sections, each extending partially around the circumference of the engine casing 12. For example, it is envisioned and well within the scope of the subject disclosure that the manifold system 10 could be provided with two manifold half-sections of approximately 180° each, wherein each half-section would include a separate manifold inlet for receiving fuel from a supply source. Alternatively, the system could be provided with four manifold quarter-sections of 90° each. Any of these alternative arrangements can be assembled and tested as complete subassemblies prior to installation on the engine.

Figure 3A:
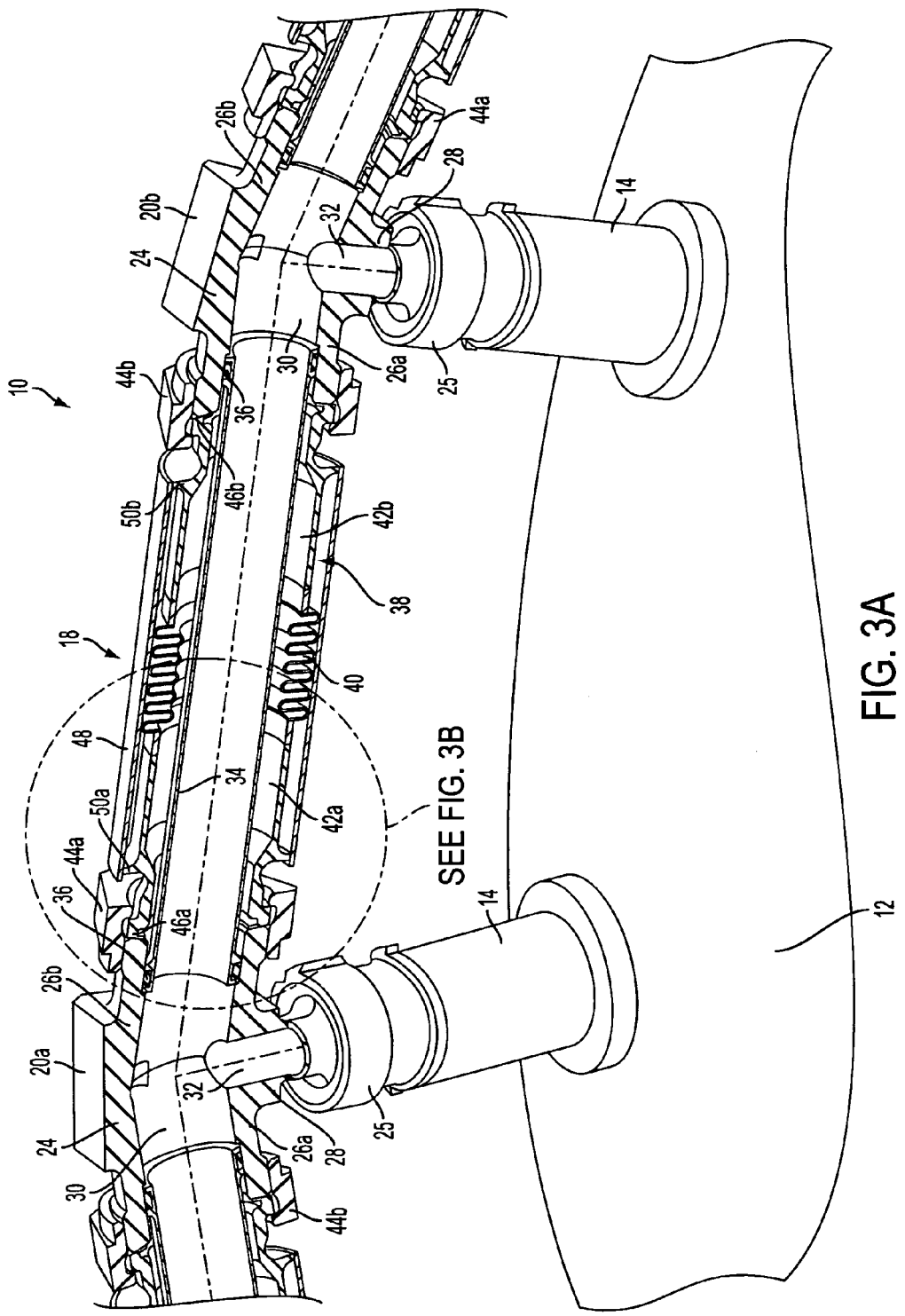
FIG. 3A is a cross-sectional view of a section of a radially configured fuel distribution manifold system constructed in accordance with a preferred embodiment of the subject invention, which includes a single fuel circuit for delivering fuel into the combustor casing of a gas turbine engine.
Figure 3B:
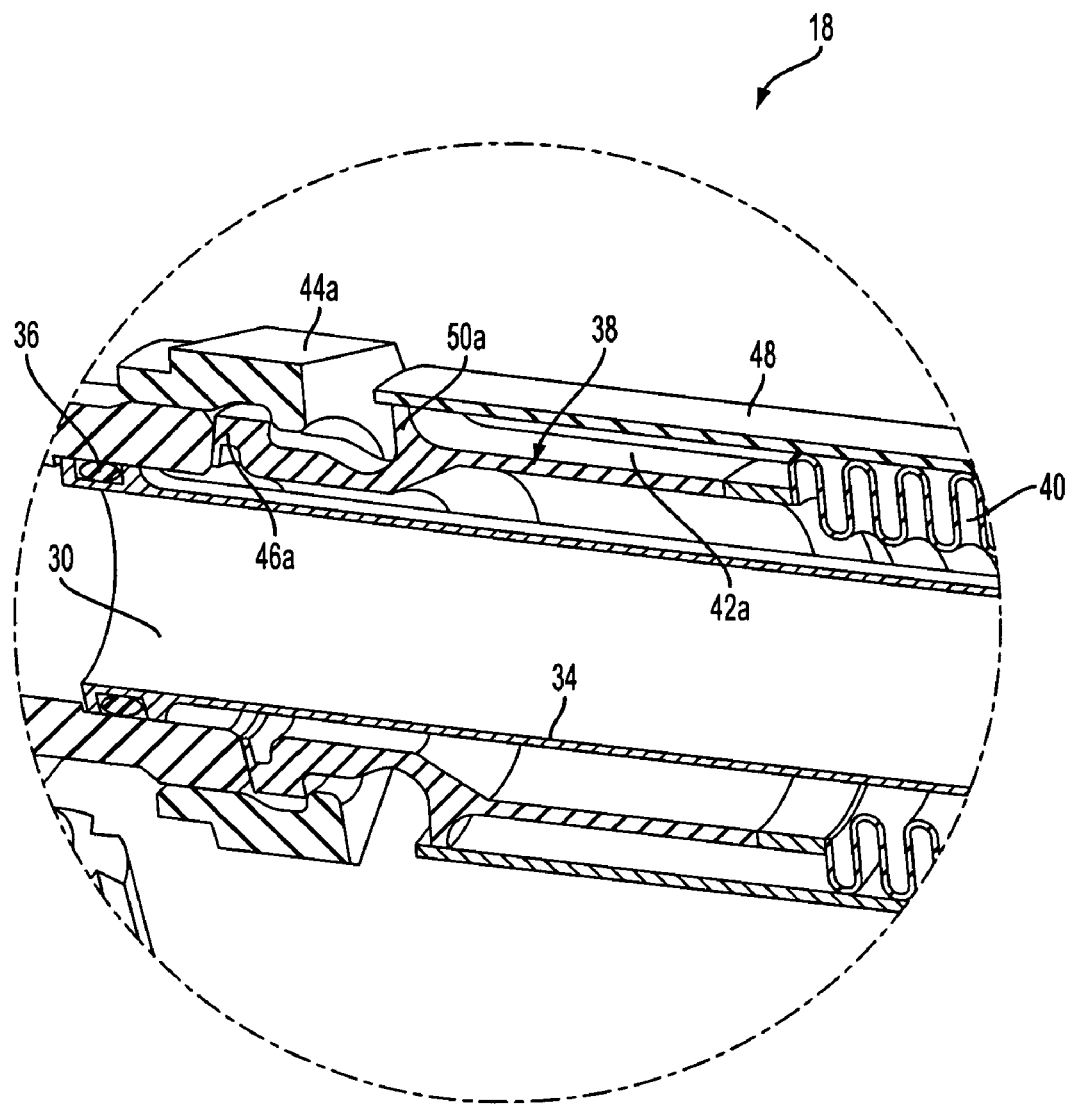
FIG. 3B is an enlarged localized view of the manifold system shown in FIG. 3A showing the sealing tube of the manifold segment in a first unexpanded condition before the combustor casing thermally expands.

Referring to FIGS. 3A and 3B, there is illustrated an exemplary segment 18 of the fuel distribution manifold system 10 of the subject invention, in the radial configuration of FIG. 2. As illustrated, manifold segment 18 is located between two adjacent inlet fittings 20a, 20b. Each inlet fitting 20a, 20b includes a main body portion 24 having left and right lateral branch sections 26a, 26b and a lower branch section 28 having a connective coupling 25 associated therewith for interacting with a fuel injector 14. A main fuel passage 30 extends through the main body portion 24 and the lateral branch sections 26a, 26b of each inlet fitting 20a, 20b. A fuel feed passage 32 extends through the lower branch section 28 of each inlet fitting 20a, 20b and communicates with the main fuel passage 30 for directing fuel to the fuel injectors 14.

As shown, by way of example, manifold segment 18 includes an elongated fuel transfer tube 34 that extends between the two adjacent inlet fittings 20a and 20b. More particularly, as shown in FIG. 3A, fuel transfer tube 34 extends between the right lateral branch 26b of inlet fitting 20a and the left lateral branch 26a of inlet fitting 20b. As best seen in FIG. 3B, each end of fuel transfer tube 34 carries a seated O-ring seal 36. The O-ring seals 36 provide a dynamic seal between the interior surface of the main fuel passage 30 and the fuel transfer tube 34. As explained in further detail below, this dynamic seal arrangement permits the two adjacent inlet fittings 20a, 20b to move relative to the fuel transfer tube 34 when the combustor casing 12 thermally expands and contracts during engine operation, without leakage.

It is envisioned that more than one O-ring seal 36 can be seated at each end of fuel transfer tube 34. For example, primary and secondary sealing rings can be provided at each end of the fuel transfer tube 34. It is also envisioned that one or more O-ring seals can be seated within grooves formed in the main fuel passage 30 of each inlet fitting to provide the dynamic connection with the fuel transfer tube 34.

Manifold segment 18 further includes an axially expandable sealing tube 38 surrounding the fuel transfer tube 34 to provided leak protection with respect to the dynamic seals of fuel transfer tube 34. Sealing tube 34 includes an undulating bellows section 40 disposed between opposed left and right tubular end sections 42a and 42b. The centrally located bellows section 40 may be formed integral with the opposed end sections 42a, 42b, from the same material, or it may be a separately formed section made from the same or dissimilar material, that is joined to the opposed end sections 42a, 42b by conventional joining techniques such as welding or brazing. Furthermore, the bellows section 40 can be offset from the center of the sealing tube 38.

The opposed end sections 42a, 42b of sealing tube 38 are fixedly (i.e., statically) connected to the two adjacent inlet fittings 20a, 20b. This fixed or static connection is accomplished by conventional mechanical connecting methods, such as, for example, by employing beam seal fittings, flared fittings, flareless fittings or the like. More particularly, as shown, the left end section 42a of sealing tube 38 has a mounting flange 46a that is captured and fixedly connected to the right lateral branch 26b of inlet fitting 20a by a coupling 44a. Similarly, the right end section 42b of sealing tube 38 has a mounting flange 46b that is captured and fixedly connected to the left lateral branch 26a of inlet fitting 20b by a coupling 44b. As explained in further detail below, the bellows section 40 of sealing tube 38 accommodates movement of the two adjacent tee fittings 20a, 20b, relative to the dynamically sealed fuel transfer tube 34, as the combustor casing 12 thermally expands and contracts during engine operation.

Manifold segment 18 further includes an elongated cover tube 48 for protecting the bellows section 40 of sealing tube 38 during engine operation. The right end of cover tube 48 is fixedly attached to an annular securement flange 50b of expansion tube 38. This is preferably accomplished by conventional joining techniques such as, welding or brazing. The opposed left end of cover tube 48, adjacent inlet fitting 20a is unjoined and free to move relative to flange 50a, to accommodate relative movement of the sealing tube 38 and cover tube 48 as the combustor casing 12 thermally expands and contracts during engine operation. Those skilled in the art will readily appreciate that either end of cover tube 48 could be joined to sealing tube 38, as long as the opposite end is unjoined.

Figure 3C:
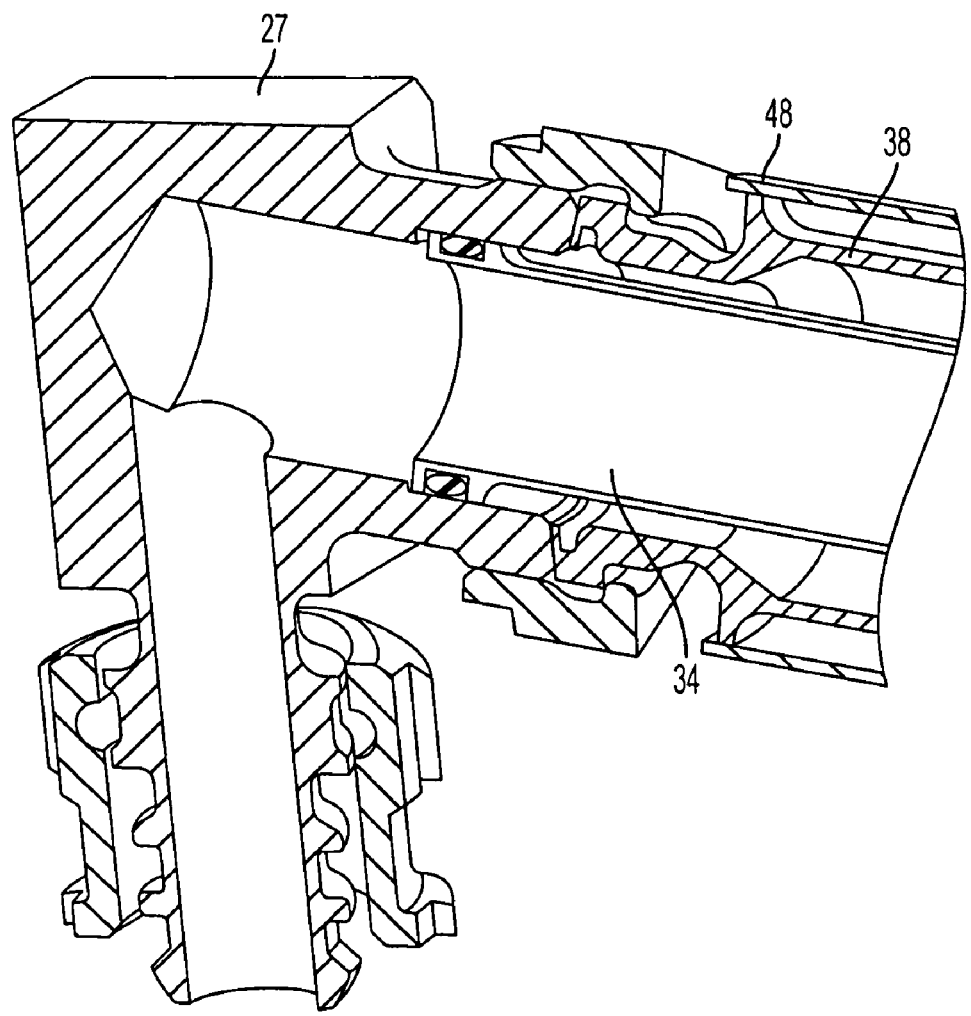
FIG. 3C illustrates a terminal end fitting of the manifold system of FIGS. 3A and 3B.

Those skilled in the art will also readily appreciate that the fuel distribution manifold system 10 of the subject invention is not formed in a continuous endless loop. Therefore, the system necessarily includes a terminal end fitting 27 at the end opposite the manifold inlet 22, as illustrated for example in FIG. 3C. Terminal end fitting 27 is substantially similar to the inlet fittings 20a, 20b, except that the end fitting 27 has only one lateral branch for receiving the end portion of a fuel transfer tube 34, rather than two.

Figure 4A:
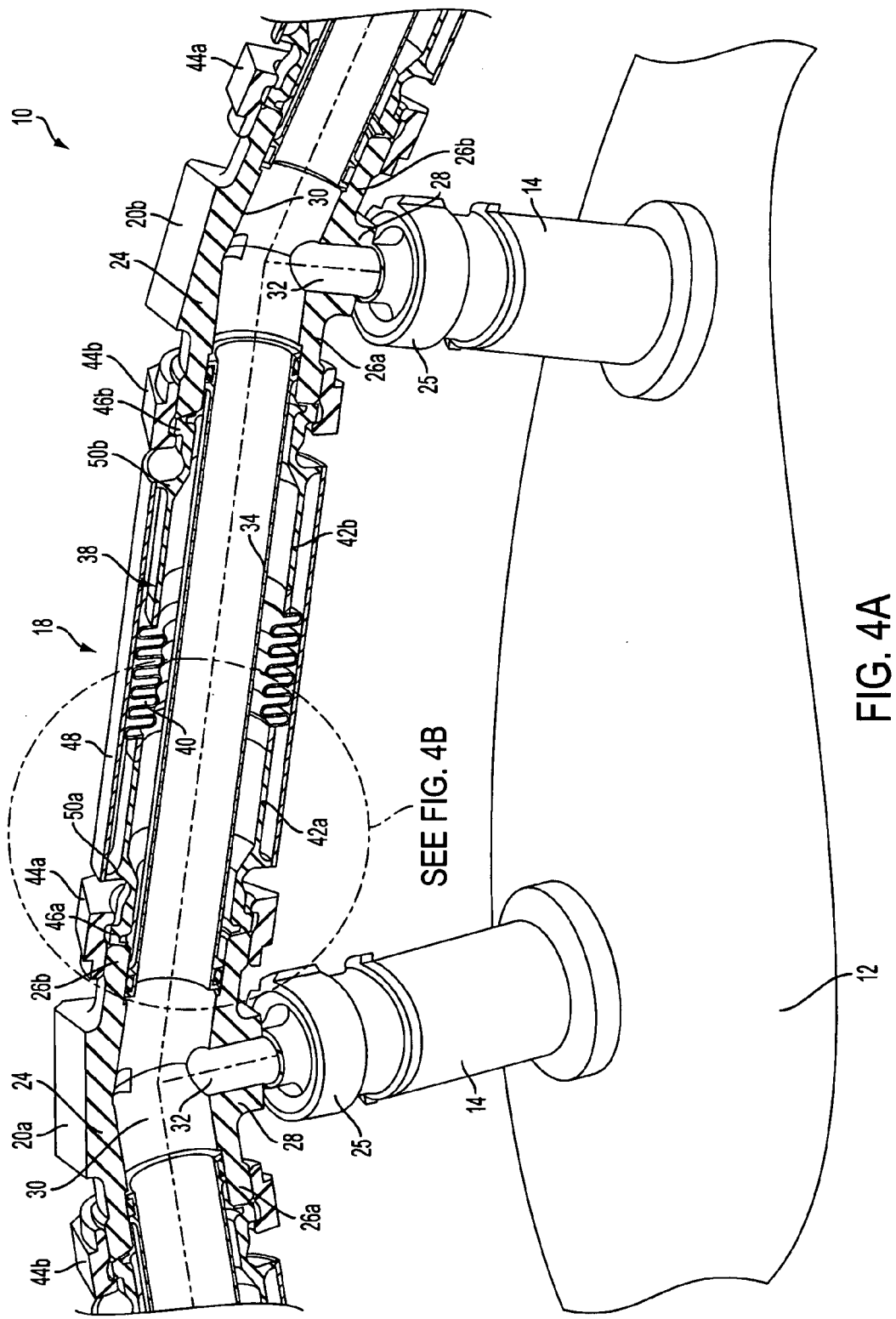
FIG. 4A is a cross-sectional view of the section of fuel distribution manifold system shown in FIG. 3A, wherein the sealing tube of the manifold segment is in a second axially expanded condition to accommodate the thermal expansion of the combustor casing.
Figure 4B:
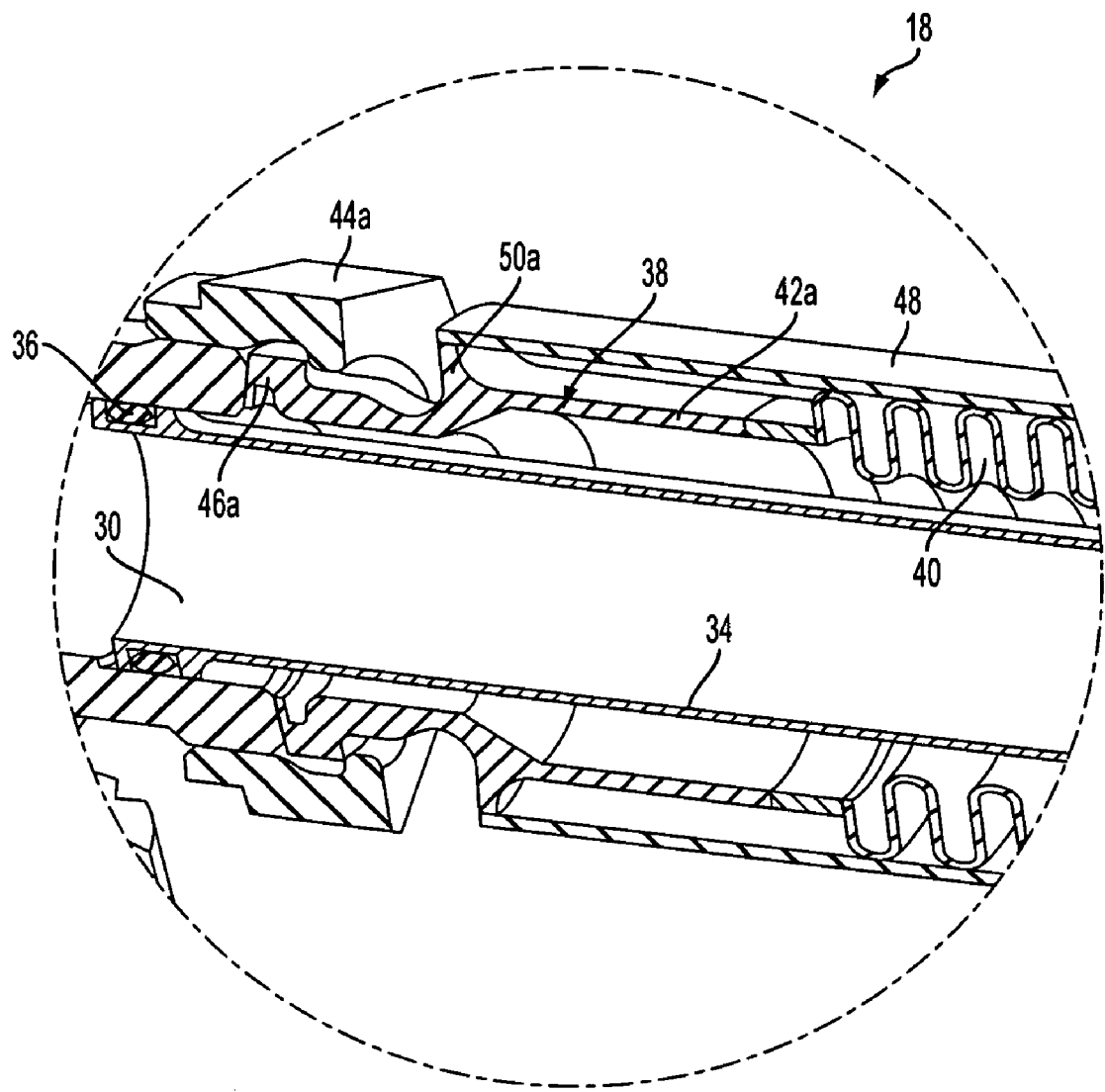
FIG. 4B is an enlarged localized view of the manifold system shown in FIG. 4A showing the axial movement of the sealing tube relative to the position shown in FIG. 3B.

Turning now to FIGS. 4A and 4B, there is illustrated the same exemplary manifold segment 18 shown in FIGS. 3A and 3B, at a point in time wherein the two adjacent inlet fittings 20a and 20b have moved apart from one another (i.e., the arc length between the two inlet fittings has increased) as a result of the thermal expansion of the combustor casing 12 during engine operation. As illustrated, the bellows section 40 of sealing tube 38 has expanded axially to accommodate the relative movement of the two adjacent inlet fittings 20a and 20b. The axial movement of the sealing tube 38 is best exemplified by comparing FIG. 3B to FIG. 4B. For example, when the bellows section 40 expands axially, the annular flange 50a of sealing tube 38 moves relative to the left end of cover tube 48, from the position shown in FIG. 3B to the position shown in FIG. 4B. As this movement is occurring, the O-ring seals 36 seated at the ends of fuel transfer tube 34 provide a dynamic seal between the interior surfaces of the main fuel passages 30 of inlet fittings 20a and 20b, and the fuel transfer tube 34.

Figure 5:
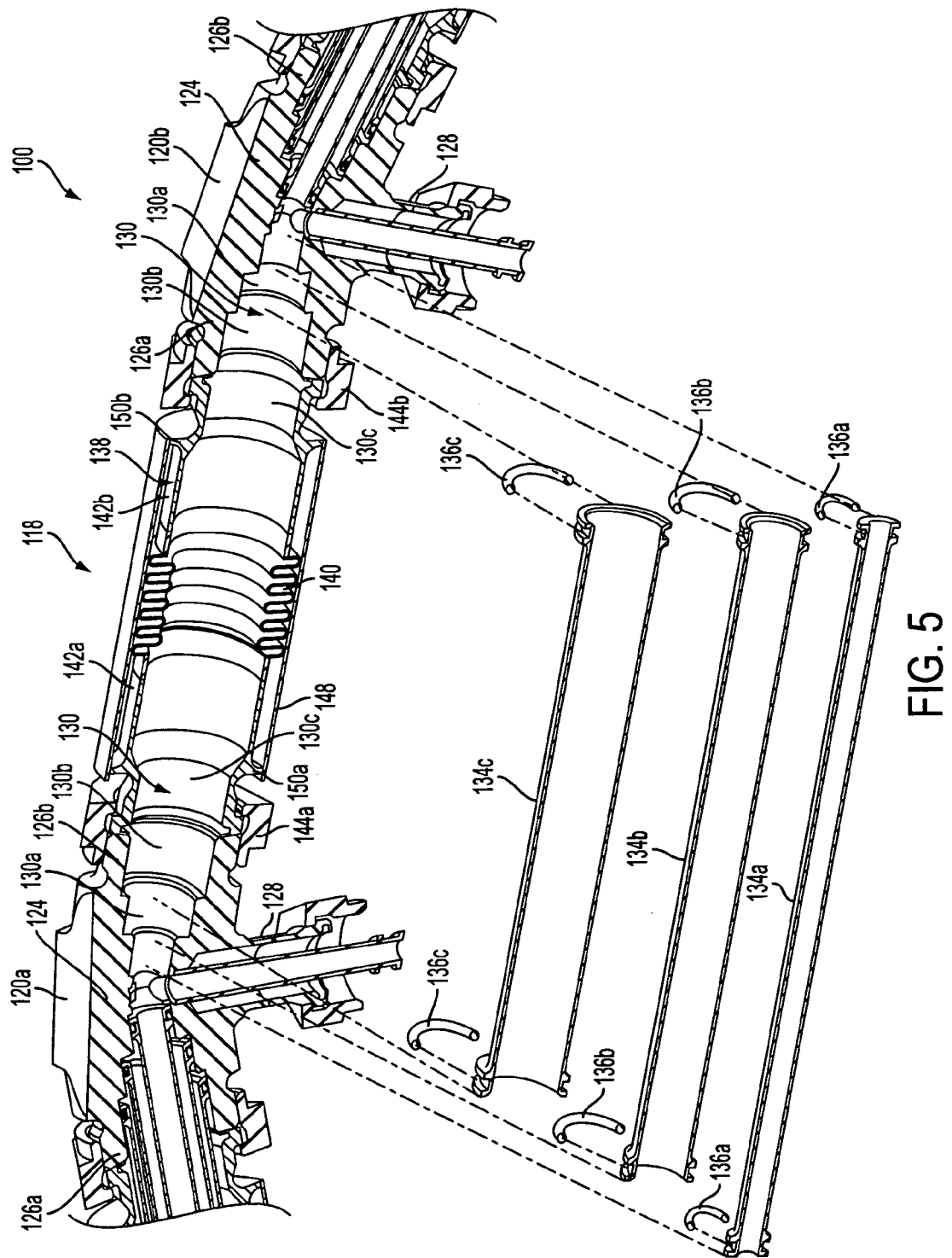
FIG. 5 is a cross-sectional view of a section of a radially configured fuel distribution manifold system constructed in accordance with another preferred embodiment of the subject invention, which includes three fuel circuits for delivering fuel to the combustor casing of a gas turbine engine employing staged fuel combustion.
Figure 6:
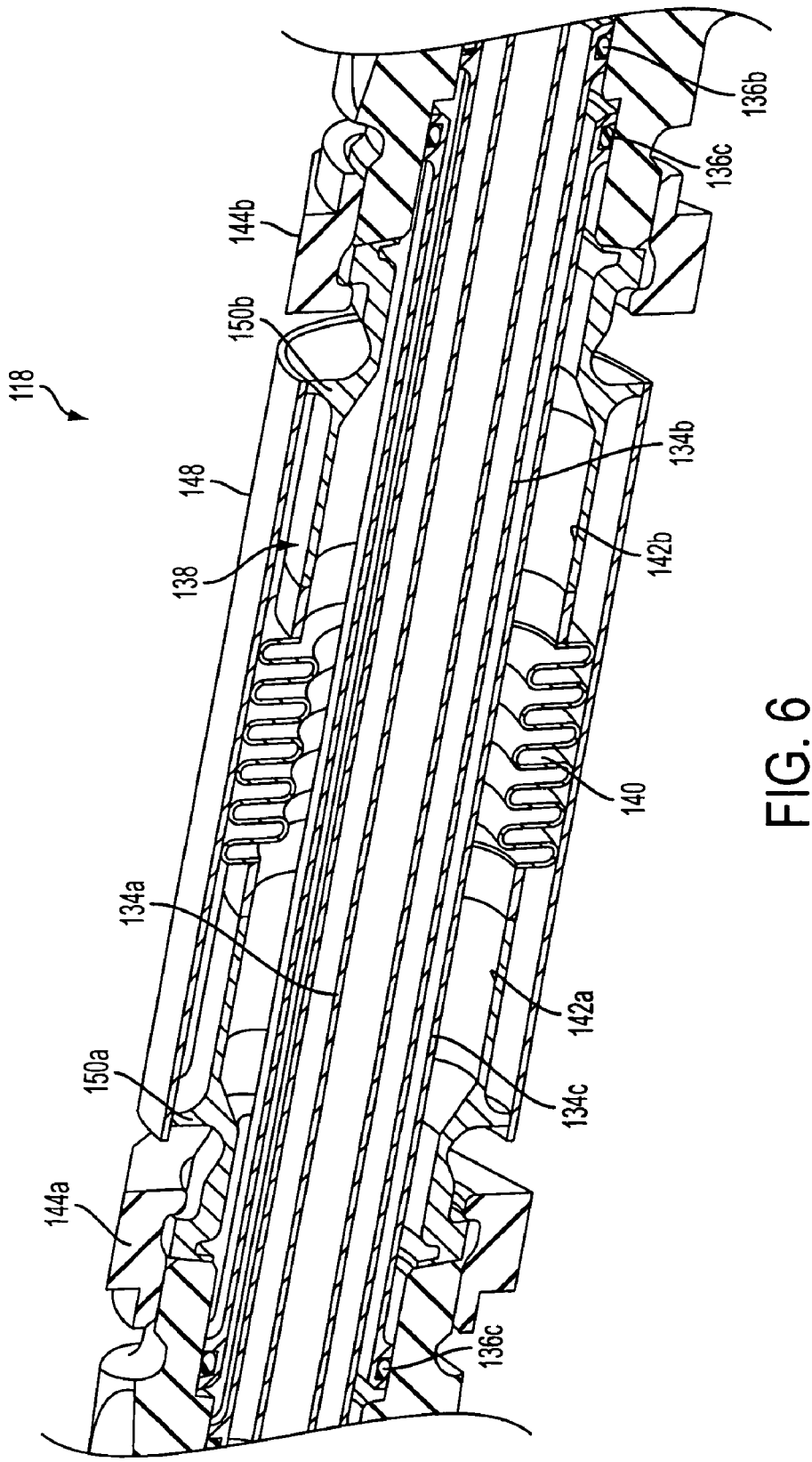
FIG. 6 is a cross-sectional view of the fuel distribution manifold system shown in FIG. 5, wherein the fuel circuit components are in an assembled condition.

Referring now to FIGS. 5 and 6, there is illustrated an exemplary section of another fuel distribution manifold system constructed in accordance with a preferred embodiment of the subject invention and designated generally by reference numeral 100. Manifold system 100 is adapted and configured for use in conjunction with a gas turbine engine employing staged combustion. In a staged combustion system, selected fuel lines of the manifold assembly are shut-off at certain times during engine operation, while other fuel lines remain flowing. This is intended to improve engine efficiency and in some instances promote combustion stability. It is envisioned that the staging of fuel injectors can be achieved manually or through a computerized fuel control system. As explained in more detail below, the manifold assembly 100 is configured so that the selected fuel lines that are in use continuously cool the fuel lines that are not in use, thereby preventing stagnant fuel in those lines from coking.

A shown in FIGS. 5 and 6, the exemplary manifold segment 118 of manifold assembly 100 is located between two adjacent inlet fittings 120a, 120b. Each inlet fitting 120a, 120b includes a main body portion 124 having left and right lateral branch sections 126a, 126b and a lower branch section 128. A stepped fuel passage 130 is formed in each branch section 126a, 126b of main body portion 124 to accommodate three separate, but nested and coaxially arranged, fuel transfer tube 134a, 134b and 134c. More particularly, the stepped fuel passage 130 in each branch section 126a, 126b has an inner passage section 130a for accommodating an inner fuel transfer tube 134a, a medial passage section 130b for accommodating a medial fuel transfer tube 134b and an outer passage section 130c for accommodating an outer fuel transfer tube 134c. By nesting the plural fuel transfer tubes 130a-130c, fuel flowing through one or more of the transfer tubes will continuously cool the fuel tubes not in use, due to their close proximity to one another, by lowering the wetted wall temperatures of the un-used fuel lines through heat transfer, thereby preventing stagnant fuel in those lines from coking.

As explained in more detail below with reference to FIGS. 7A, 7B, 8 and 9, the inner fuel transfer tube 134a is adapted and configured to deliver fuel to one fuel circuit of manifold assembly 100, while the medial fuel transfer tube 134b and outer fuel transfer tube 134c are adapted and configured to deliver fuel to two other fuel circuits of manifold assembly 100. More particularly, when the manifold assembly 100 is used in conjunction with multi-staged fuel injectors (i.e., fuel injectors having a pilot stage and a main stage), the inner fuel transfer tube 134a delivers fuel to the pilot stage of the fuel injector through one fuel circuit, while the medial and outer fuel tubes 134b and 134c alternately deliver fuel to the main stage of the fuel injector through two other fuel circuits, as directed by a fuel control system.

With continuing reference to FIGS. 5 and 6, an O-ring seal 136a is seated at each end of the inner fuel transfer tube 134a to provide a dynamic seal between the interior surface of the inner fuel passage section 130a and the inner fuel transfer tube 134a. Similarly, an O-ring seal 136b is seated at each end of the medial fuel transfer tube 134b to provide a dynamic seal between the interior surface of the medial fuel passage section 130b and the medial fuel transfer tube 134b. An O-ring seal 136c is also seated at each end of the outer fuel transfer tube 134c to provide a dynamic seal between the interior surface of the outer fuel passage section 130c and the inner fuel transfer tube 134c. As explained above with respect to manifold assembly 10, this dynamic seal arrangement permits the two adjacent inlet fittings 120a, 120b to move relative to the three fuel transfer tubes 134a-134c without leakage when the combustor casing 12 thermally expands and contracts during engine operation. While the three fuel transfer tubes 134a-134c are shown and described as separate from one another, it is envisioned that the fuel transfer tubes can be formed as a unitary structure to ease assembly.

Manifold segment 118 further includes a radially outer, axial expandable sealing tube 138 that has an undulating bellows section 140 disposed between opposed left and right tubular end sections 142a and 142b. The opposed end sections 142a, 142b are fixedly (i.e., statically) connected to the two adjacent inlet fittings 120a, 120b by couplings 144a and 144b, respectively. As explained above, the bellows section 140 of sealing tube 138 accommodates movement of the two adjacent inlet fittings 120a, 120b, relative to the three dynamically sealed fuel transfer tubes 134a-134c, as the combustor casing 12 thermally expands and contracts during engine operation.

Manifold segment 118 further includes an elongated cover tube 148 for protecting the bellows section 140 of sealing tube 138 during engine operation. The right end of cover tube 148 is fixedly attached to an annular securement flange 150b of expansion tube 138, while the opposed left end of cover tube 148, adjacent inlet fitting 120a is unjoined and free to move relative to flange 150a, to accommodate relative movement of the sealing tube 138 and cover tube 148 as the combustor casing 12 thermally expands and contracts during engine operation.

Figure 7B:
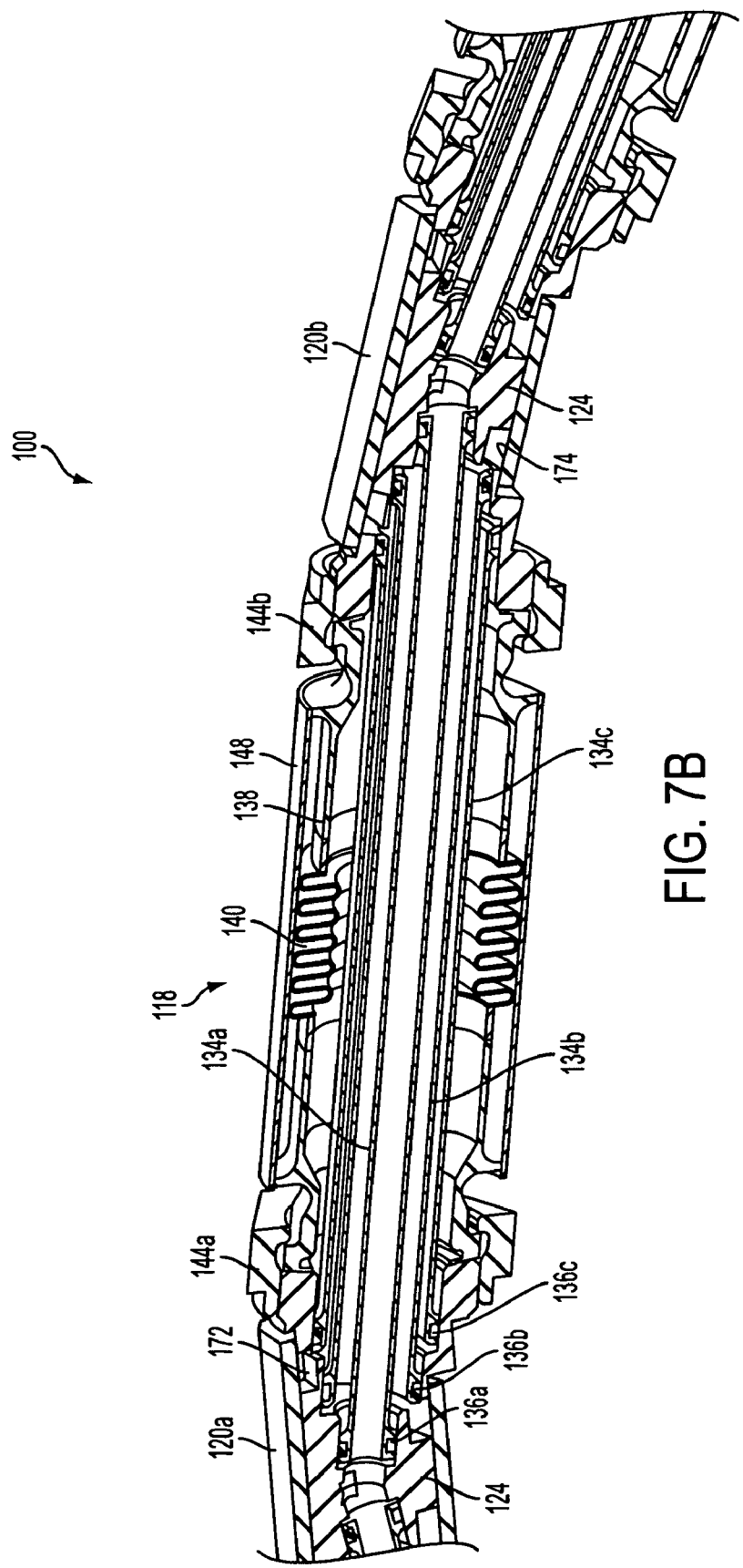
FIG. 7B is a perspective view taken along Line 7B-7B of FIG. 7A showing the internal structures of the fuel manifold system of FIGS. 5 and 6.
Figure 8:
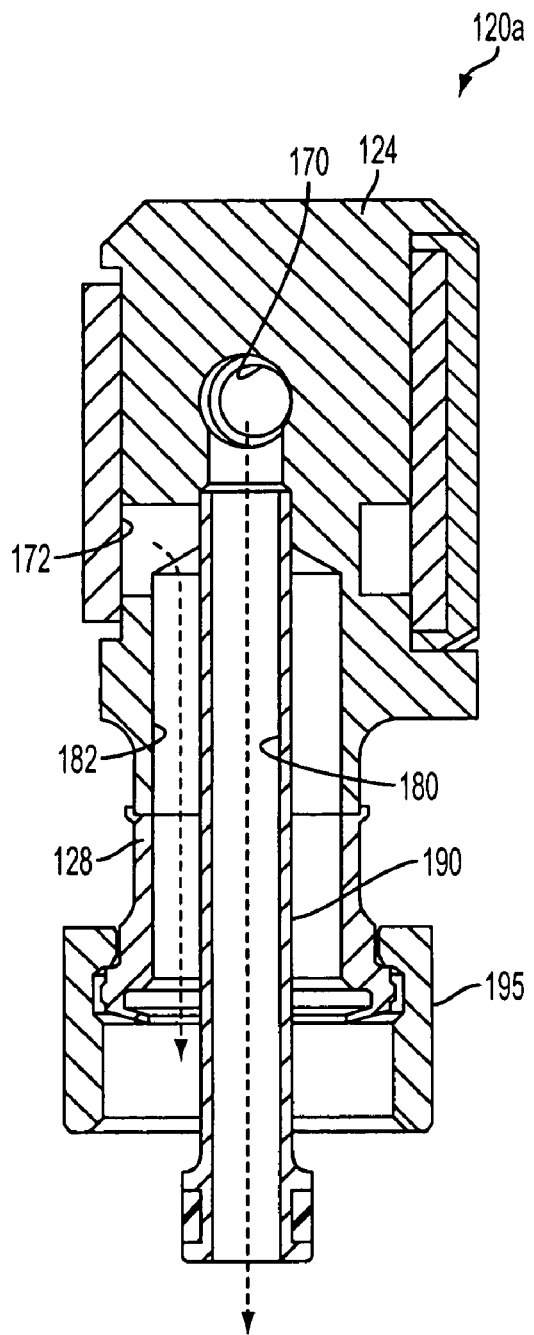
FIG. 8 is a cross-sectional view taken along line 8-8 of FIG. 7A, showing the first and second fuel circuits of the manifold assembly of FIGS. 5 and 6, formed within the left fuel inlet fitting shown in FIGS. 7A and 7B.
Figure 9:
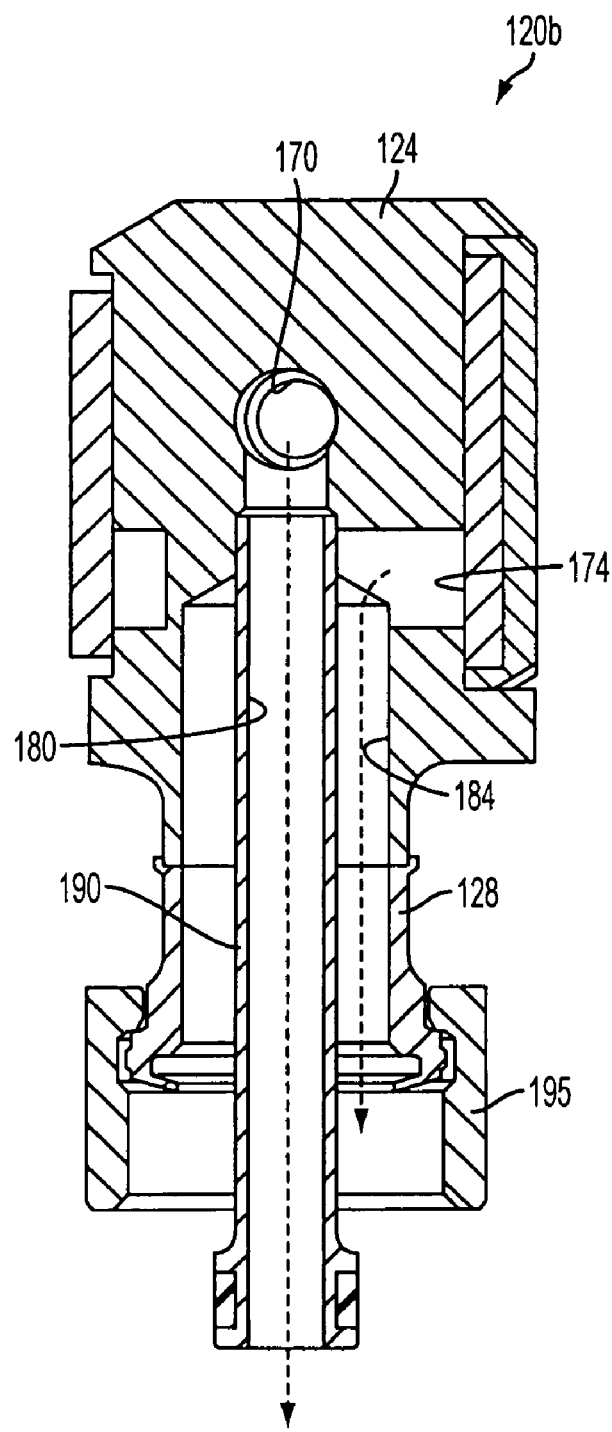
FIG. 9 is a cross-sectional view taken along line 9-9 of FIG. 7A, showing the first and third fuel circuits of the manifold assembly of FIGS. 5 and 6 formed within the right fuel inlet fitting shown in FIGS. 7A and 7B.

Referring now to FIGS. 7A and 7B, in accordance with the subject invention, the left inlet fitting 120a is adapted and configured to facilitate the delivery of fuel to an associated staged fuel injector (not shown) from the inner fuel transfer tube 134a and the outer fuel transfer tube 134c, as shown in FIG. 8 and explained further below. In contrast, the right inlet fitting 120b is adapted and configured to facilitate the delivery of fuel to an associated staged fuel injector (not shown) from the inner fuel transfer tube 134a and medial fuel transfer tube 134b, as shown in FIG. 9 and explained further below. Those skilled in the art will readily appreciate that constructing the manifold assembly 100 so that inlet fittings 120a, 120b are alternately positioned around the circumference of the engine casing 12 will enable staged combustion under varying engine operating conditions as commanded by a fuel control system.

Referring now to Fig, 7B in conjunction with FIG. 8, the left inlet fitting 120a provides an unobstructed flow path 170 between the inner fuel transfer tube 134a and the first fuel circuit 180 of manifold assembly 100. In addition, the left inlet fitting 120a provides an unobstructed flow path 172 between the outer fuel transfer tube 134c and the second fuel circuit 182 of manifold assembly 100. The first fuel circuit 180 is defined by an inlet tube 190 that preferably communicates with the pilot fuel path of a staged fuel injector associated with inlet fitting 120a. The second fuel circuit 182 is defined by the interior bore of the lower branch section 128 of inlet fitting 120a, which preferably communicates with the main fuel path of the staged fuel injector associated with inlet fitting 120a. A coupling 195 provided at the end of lower branch section 128 connects to the fuel inlet of the staged fuel injector associated with inlet fitting 120a.

Referring now to FIG. 7B in conjunction with FIG. 9, the right inlet fitting 120b provides an unobstructed flow path 170 between the inner fuel transfer tube 134a and the first fuel circuit 180 of manifold assembly 100, as the left inlet fitting 120a. In addition, the right inlet fitting 120b provides an unobstructed flow path 174 between the medial fuel transfer tube 134b and the third fuel circuit 184 of manifold assembly 100. As in inlet fitting 120a, the first fuel circuit 180 is defined by an inlet tube 190 that preferably communicates with the pilot fuel path of a staged fuel injector associated with inlet fitting 120b. The third fuel circuit 184 is defined by the interior bore of the lower branch section 128 of inlet fitting 120b, which preferably communicates with the main fuel path of the staged fuel injector associated with inlet fitting 120b. A coupling 195 provided at the end of lower branch section 128 connects to the fuel inlet of the staged fuel injector associated with inlet fitting 120b.

With continuing reference to FIGS. 8 and 9, during engine operation, under certain conditions it may be necessary to only flow fuel through the first and second fuel circuits as shown for example in FIG. 8. Consequently, fuel would flow through the inner fuel transfer tube 134a and the outer fuel transfer tube 134c, but not through the medial fuel transfer tube 134b. At such a time, the fuel flowing through the inner fuel transfer tube 134a and outer fuel transfer tube 134c would serve to cool the passage defined by the medial fuel transfer tube 134b, thereby preventing any stagnant fuel located therein from heating-up and coking the fuel line. Similarly, it may be necessary under certain conditions to only flow fuel through the first and third fuel circuits of the manifold assembly, as shown for example in FIG. 9. Consequently, fuel would flow through the inner fuel transfer tube 134a and the medial fuel transfer tube 134b, but not through the outer fuel transfer tube 134c. At such a time, the fuel flowing through the medial fuel transfer tube 134b would serve to cool the passage defined by the outer fuel transfer tube 134c, thereby preventing any stagnant fuel located therein from heating-up and coking the fuel line.

Those skilled in the art will readily appreciate that the manifold system 100 utilizes three fuel transfer tubes to distribute fuel to an engine employing staged combustion, it is envisioned that the system could be configured with more than three coaxially arranged fuel transfer tubes, depending upon the design of the fuel injectors with which the engine is fitted. For example, the fuel injector could be configured with a pilot stage and two main stages, and therefore more than three fuel transfer tubes would be needed to facilitate staged combustion.

Figure 10A:
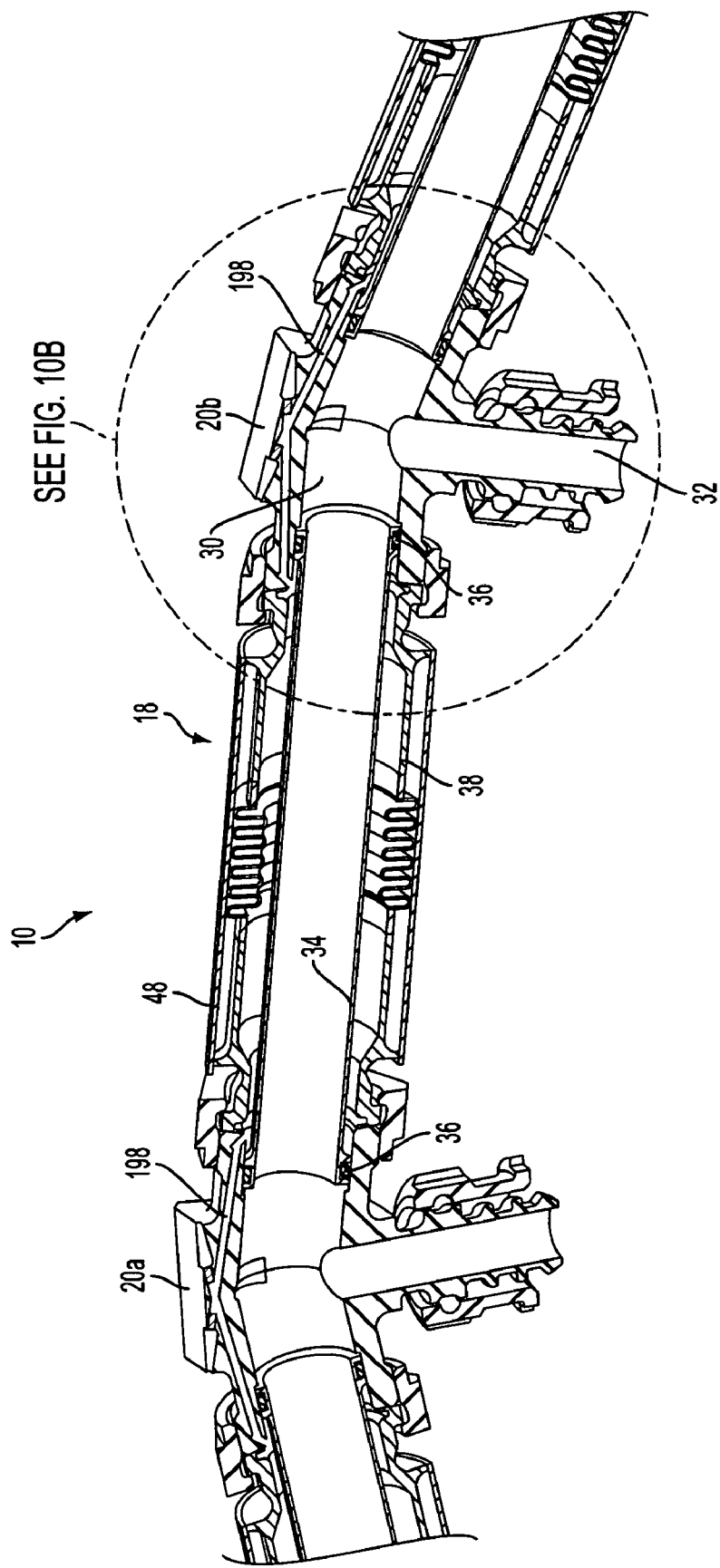
FIG. 10A is a cross-sectional view of a section of a radially configured fuel distribution manifold system constructed in accordance with yet another preferred embodiment of the subject invention, which includes a drainage system for leak detection.
Figure 10B:
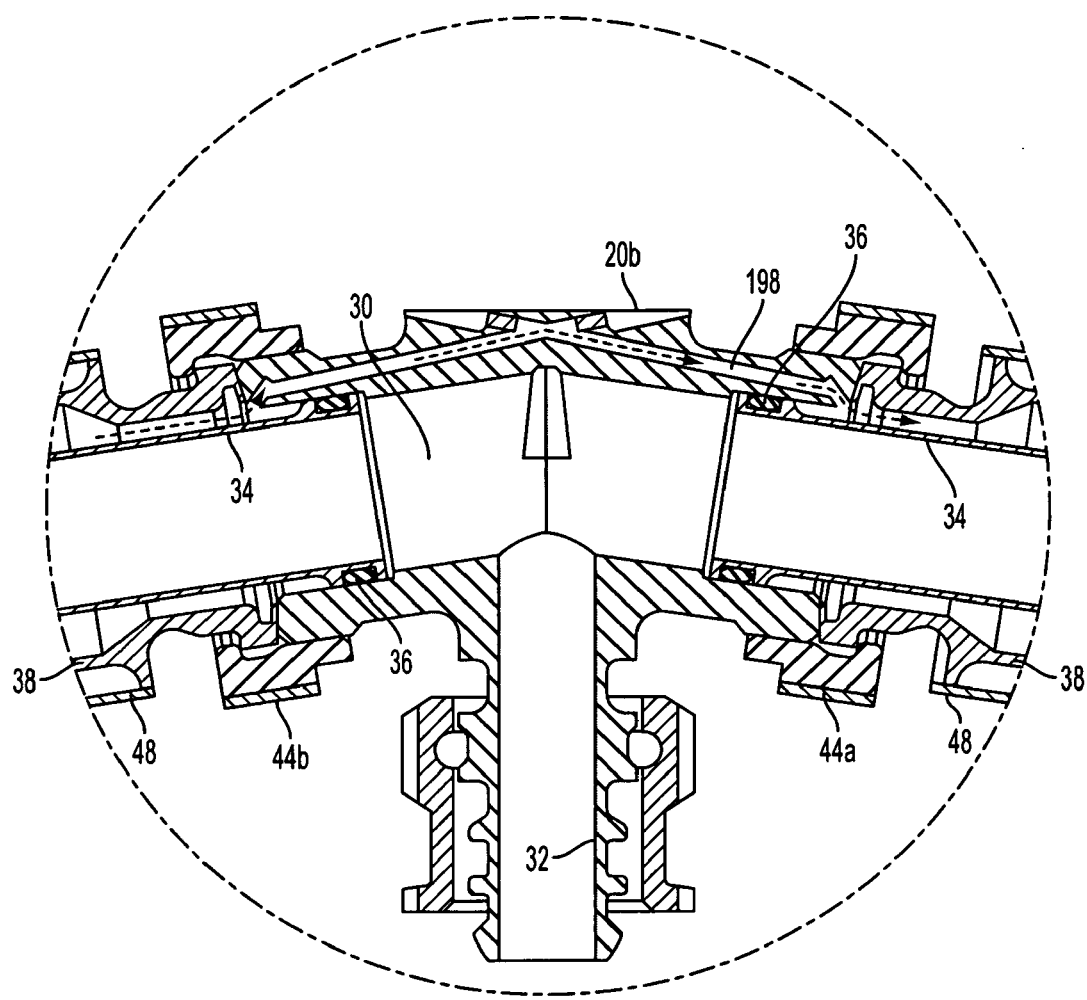
FIG. 10B is an enlarged localized view of the manifold system shown in FIG. 10A, showing the drainage passage formed in the inlet fittings of the manifold assembly.
Figure 11:
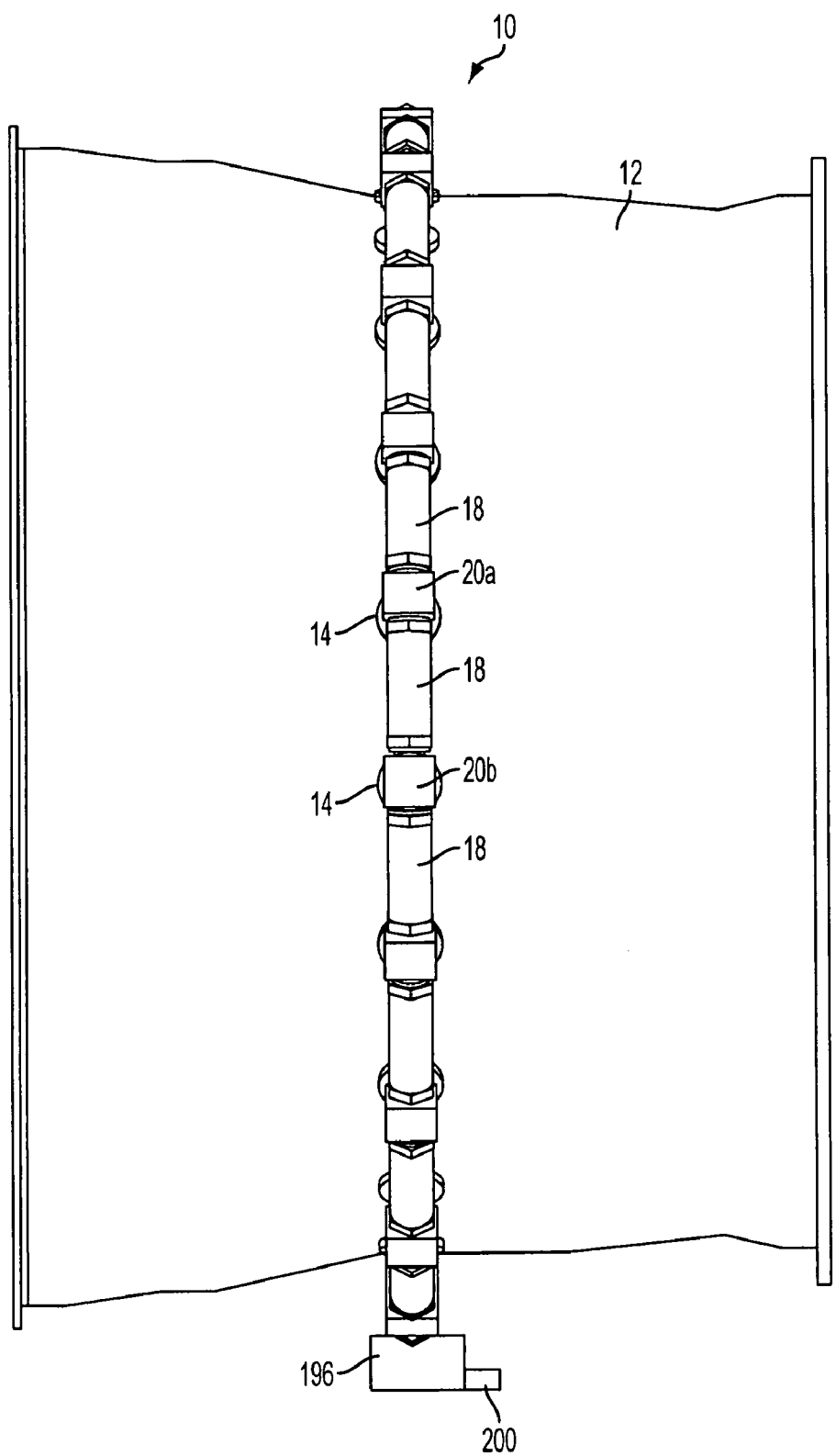
FIG. 11 is a side elevational view of the fuel distribution manifold system of the subject invention, in a radial configuration, surrounding the combustor casing of a gas turbine engine, showing the collector and sensor associated with the drainage system of FIGS. 10A and 10B.

Turning now to FIG. 10A, there is illustrated an alternative embodiment of the manifold fuel assembly 10 of the subject invention, which includes a leak protection system configured to detect and contain fuel leakage resulting from the a worn or failed O-ring seal. More particularly, as best seen in FIGS. 10B and 11, any fuel that finds its way past an O-ring seal 36 and into the space between the fuel transfer tube 34 and the sealing tube 38 within a manifold segment 18 will gravitationally flow to a collector 196 (see FIG. 11) by way of a series of interconnected drainage passages 198 formed in each of the inlet fittings 20a, 20b (see FIG. 10B). A sensor 200 associated with the collector 196 will detect the presence of fuel in the catch basin and trigger an alarm indicating there is a leak in the manifold system. While the leak detection system has been illustrated with respect to manifold assembly 10, it is envisioned that a similar system can be employed with the manifold assembly 100.

While the subject invention has been described with respect to preferred embodiments, those skilled in the art will readily appreciate that changes and modifications may be made thereto without departing from the spirit and scope of the subject invention as defined by the appended claims.

For example, those skilled in the art should readily appreciate that the manifold system of the subject invention can be employed with a variety of different styles and types of fuel injector inlet fittings. Therefore, the subject invention should not be seen as being limited in any way to a particular type or style of fuel injector inlet fitting, such as those which are illustrated herein by way of example.

What is claimed is:

1. A fuel distribution manifold system for a gas turbine engine comprising:
    a plurality of interconnected manifold segments, each manifold segment extending between a pair of fuel injector inlet fittings, each inlet fitting defining a fuel passage for directing fuel to an associated fuel injector, each manifold segment including at least one fuel transfer tube for transferring fuel between the fuel passages of two adjacent inlet fittings and a sealing tube that surrounds the at least one fuel transfer tube to provide leak protection therefor, wherein opposed end portions of the at least one fuel transfer tube are dynamically connected to the inlet fittings and opposed end portions of the sealing tube are statically connected to the inlet fittings, and wherein the sealing tubes of the plurality of interconnected manifold segments are sealingly isolated from the fuel passages of the inlet fittings.

2. A fuel distribution manifold system as recited in claim 1, wherein the sealing tube includes a resilient section for accommodating axial expansion and contraction of the sealing tube.

3. A fuel distribution manifold system as recited in claim 2, wherein the resilient section of the sealing tube is defined by a bellows structure.

4. A fuel distribution manifold system as recited in claim 3, wherein the sealing tube is dimensioned and configured such that the bellows structure has a compressive preload.

5. A fuel distribution manifold system as recited in claim 1, further comprising a protective cover tube surrounding the sealing tube, wherein one end of the protective cover tube is statically connected to the sealing tube.

6. A fuel distribution manifold system as recited in claim 1, wherein each inlet fitting has a main body portion defining a central bore to facilitate fluid communication between adjacent manifold segments.

7. A fuel distribution manifold system as recited in claim 6, wherein each inlet fitting has an outlet passage communicating with the central bore for delivering fuel to a fuel injector associated therewith.

8. A fuel distribution manifold system as recited in claim 1, wherein the opposed end portions of the at least one fuel transfer tube are dynamically connected to the inlet fittings by annular sealing means.

9. A fuel distribution manifold system as recited in claim 8, wherein the annular sealing means are seated at the opposed end portions of the at least one fuel transfer tube.

10. A fuel distribution manifold system as recited in claim 1, wherein the opposed ends of the sealing tube are statically connected to the inlet fittings by coupling means.

11. A fuel distribution manifold system as recited in claim 1, further comprising means for detecting fuel leakage in the manifold system.

12. A fuel distribution manifold system as recited in claim 11, wherein the means for detecting fuel leakage in the manifold system includes drainage passages formed in each inlet fitting to define a continuous drainage path between the plurality of manifold segments.

13. A fuel distribution manifold system as recited in claim 12, wherein a leak detection sensor is operatively associated with the drainage path.

14. A fuel distribution manifold system for a gas turbine engine employing staged combustion comprising:
    a) a plurality of circumferentially spaced apart fuel injector inlet fittings extending around a periphery of the engine, the plurality of inlet fittings including adjacent pairs of first and second inlet fittings; and
    b) a manifold segment extending between adjacent pairs of first and second inlet fittings, each manifold segment including at least first, second and third coaxially arranged fuel transfer tubes, wherein the first fuel transfer tube in each manifold segment is situated to deliver fuel to a first fuel circuit formed in both the first and second inlet fittings, the second fuel transfer tube in each manifold segment is situated to deliver fuel to a second fuel circuit formed in the first inlet fitting and the third fuel transfer tube in each manifold segment is situated to deliver fuel to a third fuel circuit formed in the second inlet fitting.

15. A fuel distribution manifold system as recited in claim 14, wherein opposed end portions of the coaxially arranged first, second and third fuel transfer tubes of each manifold segment are dynamically connected to the inlet fittings.

16. A fuel distribution manifold system as recited in claim 15, wherein the opposed end portions of the coaxially arranged fuel transfer tubes are dynamically connected to the inlet fittings by annular sealing means.

17. A fuel distribution manifold system as recited in claim 16, wherein the annular sealing means are seated at the opposed end portions of the coaxially arranged fuel transfer tubes.

18. A fuel distribution manifold system as recited in claim 15, wherein each manifold segment includes a sealing tube surrounding the coaxially arranged fuel transfer tubes.

19. A fuel distribution manifold system as recited in claim 18, wherein opposed end portions of the sealing tube are statically connected to the inlet fittings.

20. A fuel distribution manifold system as recited in claim 19, wherein the sealing tube includes a bellows section for accommodating axial expansion and contraction of the sealing tube.

21. A fuel distribution manifold system as recited in claim 20, wherein the sealing tube is dimensioned and configured such that the bellows structure has a compressive preload.

22. A fuel distribution manifold system as recited in claim 18, further comprising a protective cover tube surrounding the sealing tube, wherein one end of the protective cover tube is statically connected to the sealing tube.

23. A method of delivering fuel to a gas turbine engine employing staged combustion, comprising the steps of:
    a) providing a fuel distribution manifold assembly including:
        i) a plurality of circumferentially spaced apart fuel injector inlet fittings extending around a periphery of the engine, the plurality of inlet fittings including adjacent pairs of first and second inlet fittings; and
        ii) a manifold segment extending between adjacent pairs of first and second inlet fittings, each manifold segment including at least first, second and third nested fuel transfer tubes, wherein the first fuel transfer tube in each manifold segment is adapted to deliver fuel to a first fuel circuit of the first and second inlet fittings, the second fuel transfer tube in each manifold segment is adapted to deliver fuel to a second fuel circuit of the first inlet fitting and the third fuel transfer tube in each manifold segment is adapted to deliver fuel to a third fuel circuit of the second inlet fitting; and
    b) delivering fuel to at least one of the fuel circuits through at least one of the fuel transfer tubes.

24. A method of delivering fuel to a gas turbine engine according to claim 23, wherein the step of delivering fuel to at least one of the fuel circuits includes delivering fuel to the first fuel circuit and at least one other fuel circuit.

25. A method of delivering fuel to a gas turbine engine according to claim 23, further comprising the step of staging fuel delivery to the gas turbine engine by:
    i) delivering fuel through the first and second fuel circuits under a first engine operating condition; and
    ii) delivering fuel through the first and third fuel circuits under a second engine operating condition.

* * * * *